United States Patent [19]
Mueller

[11] Patent Number: 5,207,539
[45] Date of Patent: May 4, 1993

[54] POWER FEED MECHANISM FOR ROTARY CUTTING TOOL

[75] Inventor: Gerald E. Mueller, Frankenmuth, Mich.

[73] Assignee: Hougen, Everett Douglas, Flint, Mich.

[21] Appl. No.: 594,251

[22] Filed: Oct. 9, 1990

[51] Int. Cl.$^5$ .............................................. B23B 47/18
[52] U.S. Cl. .................................. 408/10; 74/625; 192/56 R; 192/99 S; 408/132
[58] Field of Search ............... 408/5, 76, 132, 133, 408/710, 6, 10, 11; 74/625, 106; 192/56 R, 995; 82/132; 83/543; 409/185

[56] References Cited

U.S. PATENT DOCUMENTS

| | | | |
|---|---|---|---|
| 303,073 | 8/1884 | Thompson | 74/625 |
| 1,028,395 | 6/1912 | Schatz . | |
| 1,216,284 | 2/1917 | Cash . | |
| 1,976,945 | 10/1934 | Klausmeyer | 74/625 |
| 2,033,484 | 3/1936 | Schauer et al. | 74/625 |
| 2,086,846 | 7/1937 | Bullard | 82/132 |
| 2,167,401 | 7/1939 | Foster et al. | 408/5 |
| 2,307,975 | 1/1943 | Walter | 408/185 |
| 2,562,170 | 7/1951 | Busemeyer . | |
| 2,711,549 | 6/1955 | Hirvonen . | |
| 3,398,822 | 8/1968 | Eakin | 192/66 |
| 3,574,290 | 4/1971 | Eckman . | |
| 3,577,807 | 5/1971 | Alexander | 408/132 |
| 3,747,085 | 7/1973 | Bala et al. | 408/6 |
| 3,767,313 | 10/1973 | Bohoroquez et al. . | |
| 3,989,405 | 11/1976 | Quackenbush | 408/12 X |
| 4,538,942 | 9/1985 | Vindez | 408/132 |
| 4,741,226 | 5/1988 | Bernard et al. | 74/625 |
| 4,812,089 | 3/1989 | Petrie . | |
| 4,898,265 | 2/1990 | Metcalf . | |
| 5,035,547 | 7/1991 | Shoji | 408/6 |

FOREIGN PATENT DOCUMENTS 852456  8/1981  U.S.S.R. .............................. 408/129

Primary Examiner—Daniel W. Howell

[57] ABSTRACT

A rotary cutting tool is described which includes a motor for moving the tool vertically into a surface to be cut. The motor is connected to the tool by a clutch which is most preferably a ball clutch selectively engageable to transmit drive. The clutch further moves out of engagement should a force between two clutch members exceed a predetermined slip force. This predetermined slip force is adjustable by adjusting a spring force which is applied to maintain the clutch members in the engaged position.

20 Claims, 5 Drawing Sheets

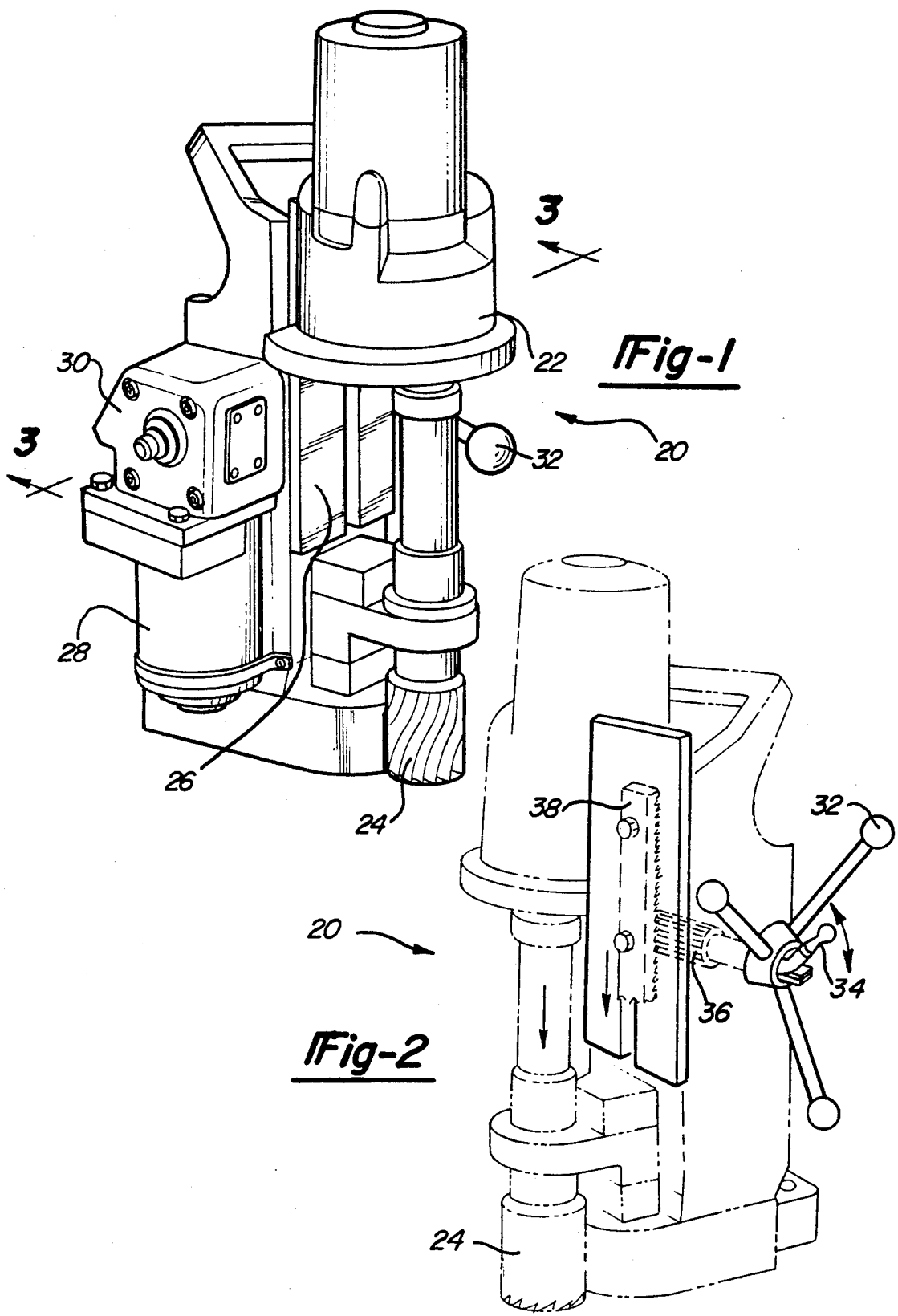

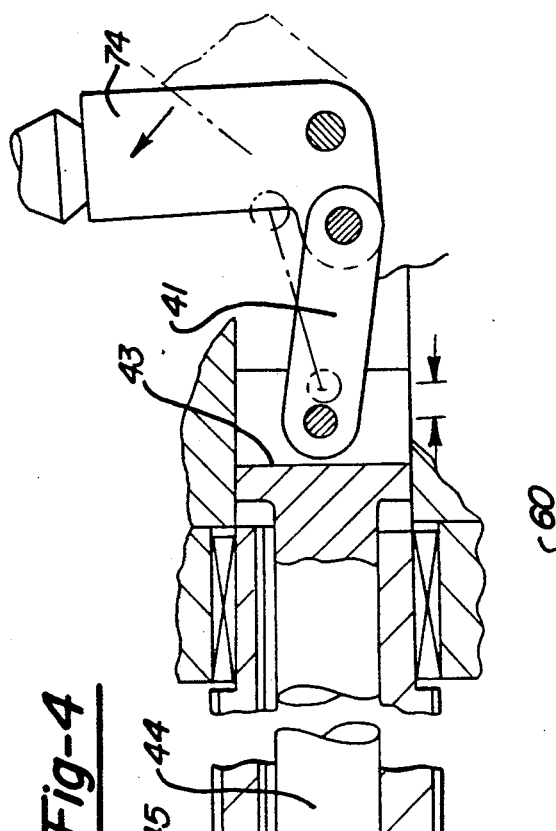
*Fig-4*
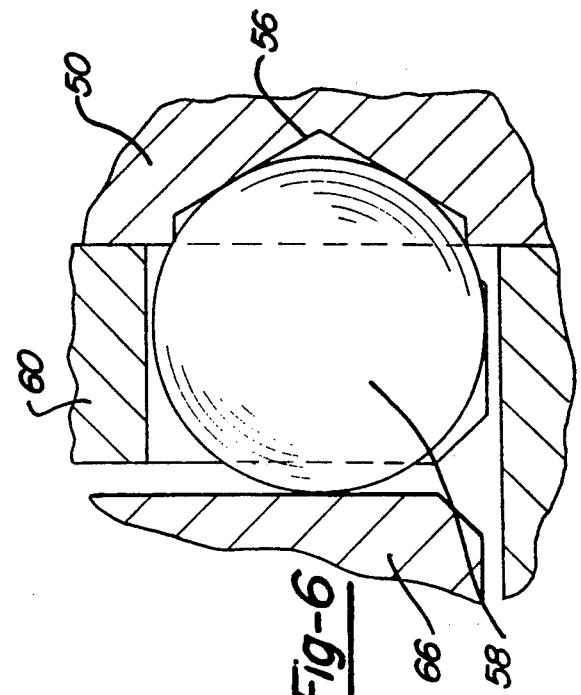
*Fig-6*
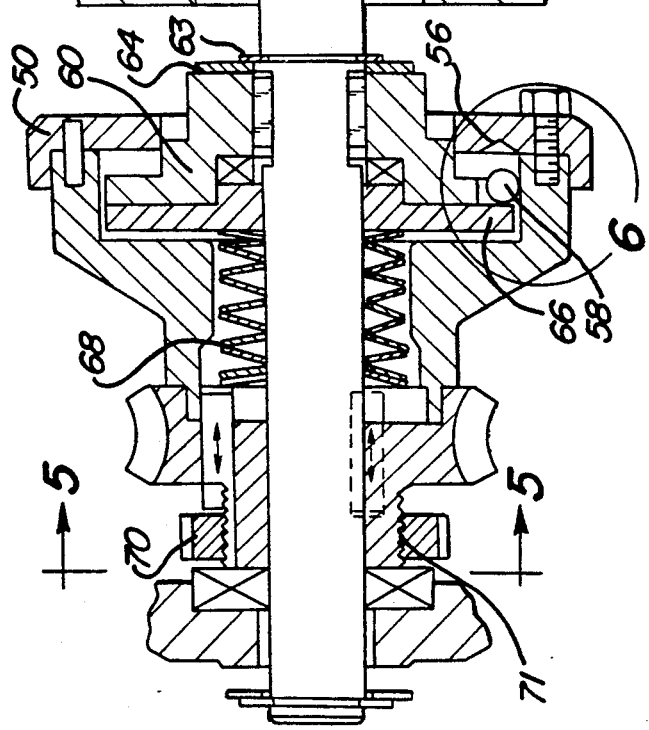
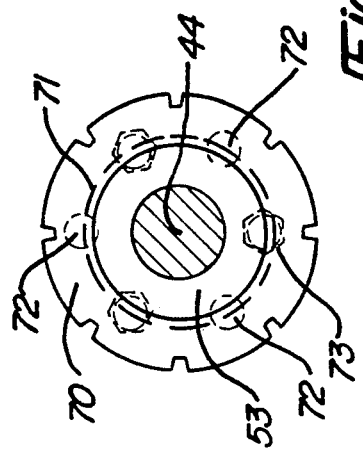
*Fig-5*

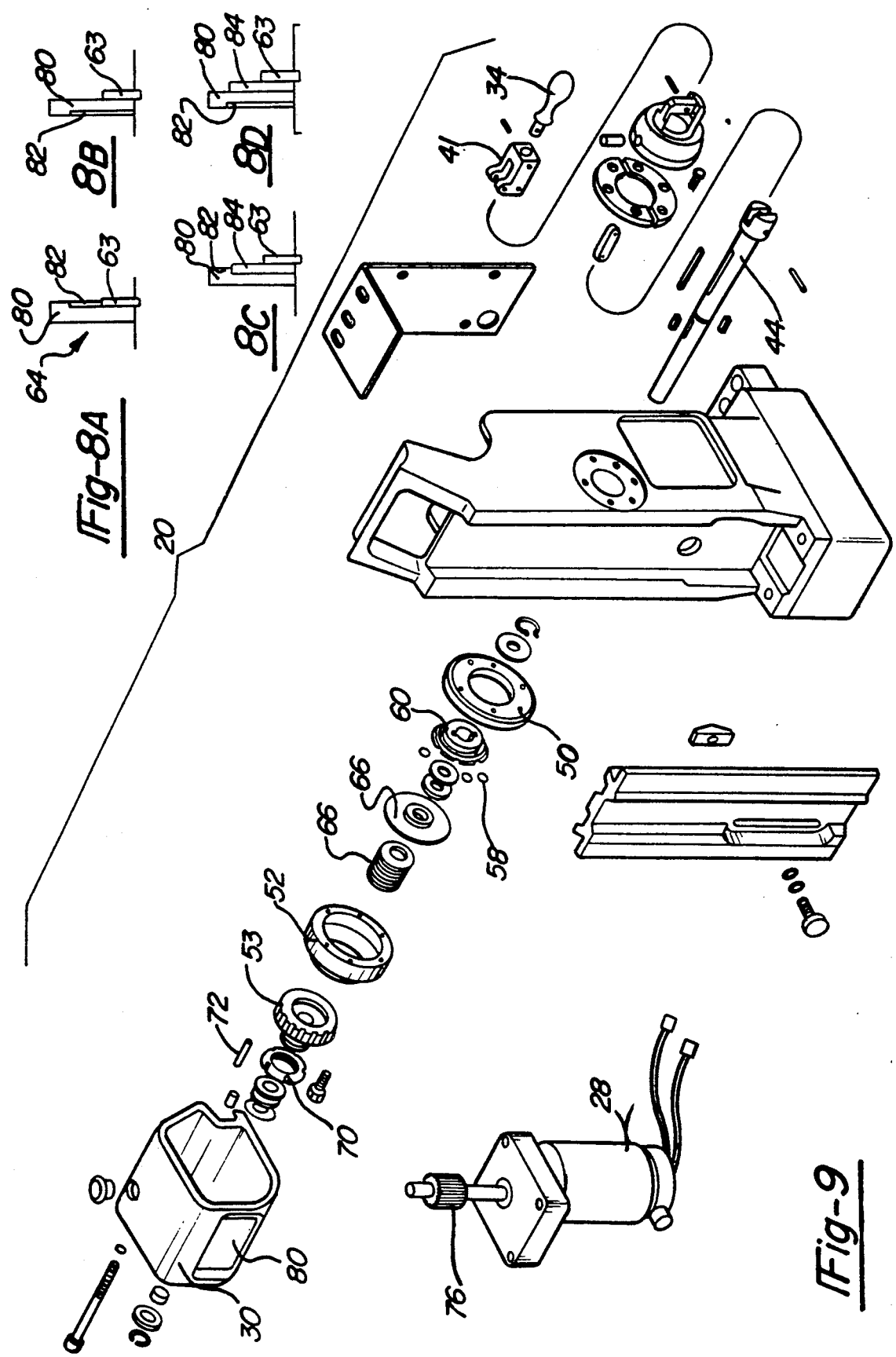

POWER FEED MECHANISM FOR ROTARY CUTTING TOOL

BACKGROUND OF THE INVENTION

This invention relates to a clutch for use with a rotary cutting tool. More particularly, this invention relates to a single clutch which achieves two functions performed by separate clutches in the prior art.

Rotary cutting tools are known which include a rotary motor driving a tool, where the tool is brought vertically into a surface to be cut. A manual drive was often utilized to bring the rotary tool vertically downwardly into the surface to be cut.

Recently, drive motors have been utilized to move the tools vertically. These prior art tools have typically utilized a first selectively actuatable clutch which may be engaged to transmit drive from a motor to move the tool vertically. When in an unactuated position the clutch does not transmit drive from the motor to the tool.

In some cases these prior art tools may have included a second clutch to provide a slip force that sets a predetermined maximum drive force or torque between the drive motor and the rotary tool. Should this predetermined force be exceeded, the second clutch typically has two members which move relative to each other such that drive is not transmitted from the motor to the tool. The use of these two separate clutches does achieve two important functions, but complicates the assembly.

In some prior art arrangements, ball clutches have been utilized as the second clutch. In a ball clutch, movement is transmitted between two clutch members by the engagement of balls associated with one clutch member which are received in notches in the other clutch member. The balls are biased into the notches to provide a contact surface which transmits drive. Should a drive force between the balls and notches exceed a predetermined slip force the balls move against the bias force out of the notches. Increasing the bias force increases the slip force. With wear, the size of the notches increases, and it becomes necessary to increase the biasing force to achieve a predetermined slip force. In particular, notches which are conical and shaped by a drill bit are utilized, and the edges of these notches wear and become rounded such they do not grip the balls as adequately as they do when new.

Ball clutch assemblies have been developed in which this biasing force is adjustable. Examples of adjustable force ball clutch assemblies are disclosed in U.S. Pat. Nos. 4,812,089 and 4,898,265. In these devices members move against a spring to compress or expand the spring and change the force biasing the balls into the notches. Neither of these patents are disclosed with a rotary cutting tool. Further, neither of these patents disclose selectively engageable clutches.

A rotary cutting tool may encounter an obstruction or may bind should the tool encounter a surface which is difficult to cut, and it is important that a maximum slip force be maintained on the ball clutch. In several prior art rotary tools the use of an adjustable force ball clutch may not be advisable since if the bias force was inadvertently set too high, drive forces between the clutch members above a desired maximum slip force could occur.

It is an object of the present invention to disclose a rotary cutting tool having a clutch assembly in which a single clutch element provides both a selectively actuatable clutch and a slip force. It is further an object of the present invention to disclose an adjustable force clutch which is utilized in a rotary cutting tool.

SUMMARY OF THE INVENTION

In a disclosed embodiment of the present invention a magnetic base drill includes a rotary tool which is driven to rotate about an axis to cut a surface. A drive means is disclosed which moves the rotary tool axially along the axis toward the surface. A clutch selectively transmits drive from the drive means to move the rotary tool along the axis. The rotary tool may often be aligned such that the axis is vertical, and in those situations the axial movement is vertical. The term "vertical movement" may be used in this application, however, this invention is not limited to any orientation of the rotary tool and vertical is used interchangeably with axial.

In a disclosed embodiment the clutch consists of at least first and second members that are selectively movable between a disengaged position and an engaged position at which the members transmit drive to move the rotary tool along the axis. Preferably, the two members are biased toward each other when in the engaged position, and may move away from each other such that they no longer transmit drive in the event that a force between the members exceeds a predetermined slip force.

In a most preferred embodiment of the present invention the first member is a selectively movable clutch plate which carries a plurality of ball elements, and the second member has a surface with notches to receive the balls and transmit rotational drive from the drive means to the clutch plate. The drive means normally rotates this second member such that when the first clutch member is engaged with the second clutch member, drive is transmitted to the first clutch member causing the rotary tool to move along the axis. Most preferably, the ball elements are at a radially outer surface of the clutch plate.

In a preferred embodiment of the present invention a spring bias maintains the balls in contact with the notches to provide the slip force. Most preferably, the bias is developed by a spring washer arrangement. Further, in a most preferred embodiment of the present invention this spring bias is adjustable. A nut can be adjusted to increase or decrease a force on the spring washer, which in turn controls the force from the spring washer on the balls.

The adjustable spring force is preferably used in combination with a sensor which monitors the rotation of the rotary tool and stops the drive means and the rotary drive means should an abnormality be detected.

In disclosed embodiments of the present invention the drive means includes a rotary motor which moves the rotary tool vertically through a gear connection. Further, in a disclosed embodiment of the present invention the rotary tool is moved by the drive means vertically downwardly into the surface to be cut, but is moved manually vertically upwardly along the axis.

These and other objects and features of the present invention can be understood from the following specification and drawings, of which the following is a brief description.

BRIEF DESCRIPTION OF THE DRAWINGS

FIG. 1 is a perspective view of a magnetic base drill.

FIG. 2 is a perspective view, partially in phantom, of the tool illustrated in FIG. 1.

FIG. 4 is a view similar to FIG. 3, but showing a clutch in an unactuated position.

FIG. 5 is a cross-sectional view along line 5—5 as shown in FIG. 4.

FIG. 6 is an enlarged view of a portion of the clutch shown in FIG. 4.

FIGS. 8a–8d show an adjustability feature according to the present invention.

FIG. 9 is an exploded view of the magnetic base drill illustrated in FIG. 1.

DETAILED DESCRIPTION OF A PREFERRED EMBODIMENT

Figure 3:
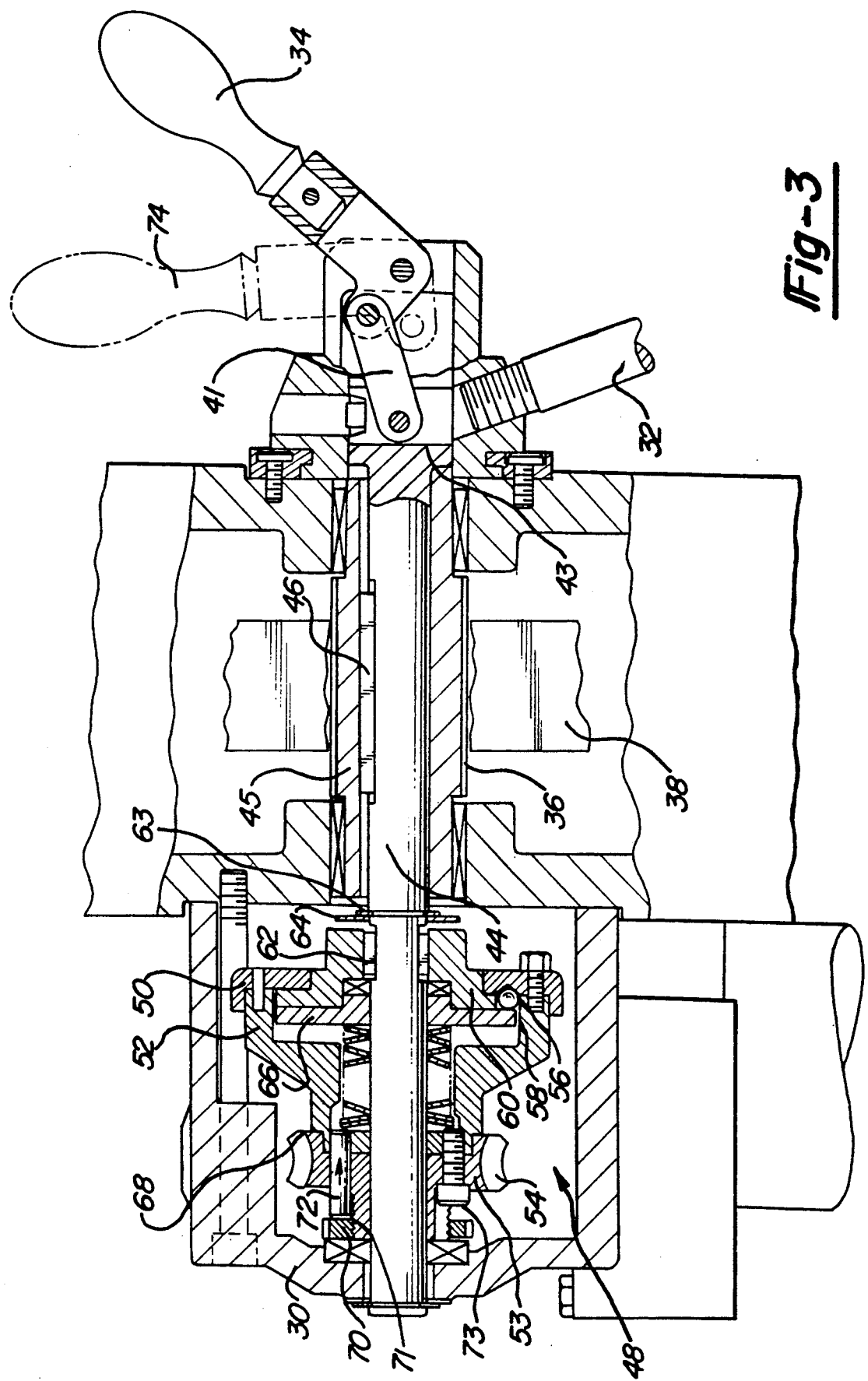
FIG. 3 is a cross-sectional view along line 3—3 as shown in FIG. 1 showing a clutch in an actuated position.

A disclosed embodiment of the present invention will now be described with reference to the drawings. FIG. 1 illustrates a magnetic base drill 20 which embodies an inventive clutch according to the present invention. As known in the art, rotary motor 22 drives a rotary tool, shown here as annular hole cutter 24, to cut a surface. It should be understood that the teachings of this invention extend to other types of rotary tools. A connection 26 guides annular hole cutter 24 vertically upwardly and downwardly towards the surface. In a disclosed embodiment of the present invention drive motor 28 is mounted directly beneath gear box 30 and drives connection 26 and annular hole cutter 24 downwardly into the surface to be cut. A manual drive is preferably utilized through handle 32 to return annular hole cutter 24 vertically upwardly.

FIG. 2 shows magnetic base drill 20 viewed from a distinct angle from that shown in FIG. 1, and with portions shown in phantom. As shown in FIG. 2, handle 32 receives clutch handle 34 at an inner periphery. Handle 32 drives pinion 36 which engages rack 38 to move annular hole cutter 24 vertically upwardly and downwardly.

Sensor 40 is mounted under the magnetic base portion of cutting tool 20 to monitor annular hole cutter 24 and ensure proper operation. Should sensor 40 detect an abnormality in the movement of annular hole cutter 24 it stops motor 22 and motor 28. A sensor as disclosed in U.S. Pat. No. 4,261,673 may be utilized, although other types of sensors would come within the scope of this invention.

FIG. 3 is a cross-sectional view through the body of magnetic base drill 20 and gear box 30. Handle 34 is illustrated in a clutch engaged position, at which toggle 41 engages head 43 of internal clutch shaft 44. Internal clutch shaft 44 is slidably connected through key, or keys 46 to external shaft 45, such that internal clutch shaft 44 rotates with, but can slide longitudinally relative to, outer shaft 45.

Clutch 48 is illustrated in an engaged position in FIG. 3. Drive clutch member 50 is pinned to connector member 52 which is in turn fixed to a gear 53, having gear teeth 54. As will be explained below, gear teeth 54 engage mating gear teeth which are driven by drive motor 28.

A plurality of notches 56 are formed in a face of drive clutch member 50 and receive a plurality of balls 58 when clutch 48 is in the engaged position. In particular, notches which are conical and shaped by a drill bit are utilized. Balls 58 are received at the outer periphery of clutch plate 60, which is slidably connected to internal clutch shaft 44 by two keys 62. Thus, clutch plate 60 rotates with, but can slide longitudinally relative to internal clutch shaft 44. The contact between balls 58 and notches 56 provides a drive connection between clutch plate 60 and drive clutch member 50. Stepped washer 64 is fixed to internal clutch shaft 44 by retainer 63 and is spaced from clutch plate 60 when in the clutch engaged position.

Plunger 66 is biased into both clutch plate 60 and balls 58 by Belleville spring washers 68 to retain balls 58 in notches 56. Adjustment nut 70 is received on threads 71 formed on gear 53, and abuts pins 72 which in turn engage spring washer 68. By adjusting the position of adjustment nut 70 on threads 71, pins 72 either compress or relax spring washer 68 to adjust the spring biasing force on plunger 66. If a force between drive clutch member 50 and balls 56 exceeds a slip force which is created by the biasing force applied by spring washer 68 through plunger 66, clutch plate 60 and balls 58 move outwardly of notches 56. By moving adjustment nut 70 on threads 71 the spring biasing force delivered from spring washer 68 on plunger 66, and the resultant slip force which must be overcome for balls 58 to move out of notches 56 and allow relative movement between drive clutch member 50 and clutch plate 60, can be adjusted.

If clutch handle 34 is moved to unactuated position 74, clutch plate 60 will move to the left as shown in FIG. 4 such that balls 58 move outwardly of notches 56. When in this unactuated position rotational drive is not transmitted from drive clutch member 50 to clutch plate 60.

Clutch 48 is shown in an unactuated position in FIG. 4. Clutch handle 34 is moved to position 74 and toggle member 41 is moved to the left from the position illustrated in FIG. 3. As toggle 41 moves to the left it presses against head 43 of internal clutch shaft 44 which slides on key 46, not shown in FIG. 4, relative to outer shaft 45. As internal clutch shaft 44 moves to the left, as shown in FIG. 4, step washer 64 eventually abuts clutch plate 60 and moves it to the left against the force of spring washers 68. In this unactuated position balls 58 are not received in notches 56 and no rotational drive is transmitted between drive clutch member 50 and clutch plate 60. The distance that ball 58 are removed from notches 56 is exaggerated, so that the fact of removal is clear.

Spring washers 68 apply a bias force attempting to force handle 34 back to the unactuated position. But, as shown in FIG. 4, the arrangement of the pivot point between toggle 41 and handle 34 is such that the force from spring washer 68 will force handle counter-clockwise as shown in this figure, and away from the actuated position. Handle 34 thus remains locked at the unactuated position until manually moved.

FIG. 5 is a cross-sectional view along line 5—5 as shown in FIG. 4. Adjustment nut 70 is received on threads 71 formed between adjustment nut 70 and gear 53 and abuts pins 72. Internal clutch shaft 44 is received at an inner periphery of gear 53. Bolts 73 which hold gear 53 to connector 52 are also shown.

The contact between one of the balls 58 and one of the notches 56 in the actuated position is illustrated in FIG. 6. Ball 58 is biased into notch 56 in drive clutch member 50. When ball 58 is received in notch 56, rotational drive is transmitted from drive clutch member 50 to clutch plate 60. Should a force between drive clutch member 50 and clutch plate 60 exceed a slip force created by the bias force applied to plunger 66 by spring washer 68, ball 58 moves outwardly of notch 56 and rotational drive will not be transmitted. Further, should clutch 48 be moved to the unactuated position, clutch plate 60 is moved against the biasing force and balls 58 move out of notches 56.

Figure 7:
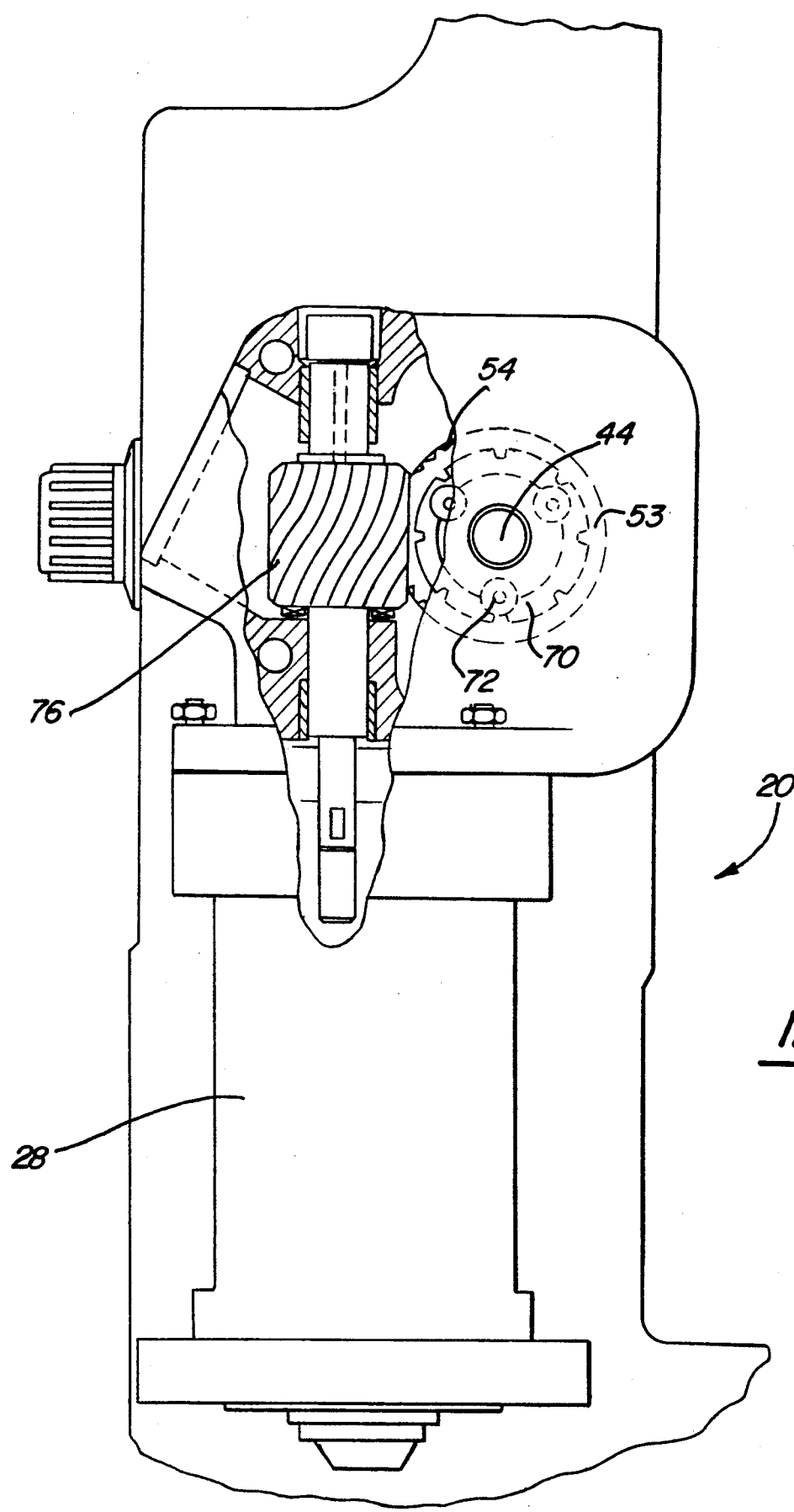
FIG. 7 is a partially cut-away end view of the magnetic base drill shown in FIG. 1.

FIG. 7 is an end view showing the connection of drive motor 28, which is preferably a rotary motor, to gear 76 which engages gear teeth 54 of gear 53. As can be understood from the combination of FIG. 7 and FIGS. 3 or 4, as gear 76 rotates gear teeth 54, drive clutch member 50 is driven to rotate and drive clutch plate 60 to rotate. Clutch plate 60 drives internal clutch shaft 44 to rotate and pinion 36 is rotated, as shown in FIG. 2. Rack 38 is then moved to adjust the vertical position of annular hole cutter 24.

Although a rotary drive motor 28 and gears 76, 53 are disclosed, it should be understood that any type of drive connection would come within the scope of this invention. In addition, although in the disclosed embodiment, drive motor 28 moves rotary annular hole cutter 24 vertically downwardly and handle 32 moves it manually upwardly, the scope of this invention is not limited to any particular combination of powered or manual vertical movement of annular hole cutter 24.

FIGS. 8a–8d show details of washer 64 which includes an adjustable stepped washer arrangement 80 to adjust the distance that washer 64 must move before it engages clutch plate 60 to move balls 58 out of notches 68. Four distinct distances between retaining member 63, which is fixed to shaft 44 and the left-most portion of stepped washer 80, are disclosed in FIGS. 8a–8d. As shown in FIG. 8a, stepped washer 80 includes a groove 82 which may be received over retaining member 63.

In a second position, stepped washer 80 is reversed such that groove 82 faces away from retaining member 63. As can be understood, the left-most portion of stepped washer 80 is now further to the left than was the case with the arrangement shown in FIG. 8a.

As shown in FIG. 8c, a second washer 84 can be placed between groove 82 and retainer member 63, wherein the second washer 84 has a thickness greater than the thickness of groove 82. In this way, the left-most portion of stepped washer 80 can be moved slightly further to the left than was the case with the position shown in 8b.

Lastly, if stepped washer 80 is again reversed and second washer 84 is used, the left-most portion of stepped washer 80 is moved even further to the left than was the case with the position shown in FIG. 8c.

In this way, the distance that washer 64, as illustrated in FIGS. 3 and 4, must move before initially contacting clutch plate 60 can be adjusted.

FIG. 9 is an exploded view of the main components of magnetic base drill 20. The parts illustrated in this exploded view will be assembled to the arrangement shown in FIGS. 3 and 4. As shown, a plurality of balls 58 are spaced circumferentially about clutch plate 60 and a plurality of pins 72 are spaced circumferentially about adjustment nut 70. A cover 80 is shown allowing access to adjustment nut 70.

The basic function of the present invention will be described with reference to the drawings. When it is desired to move annular hole cutter 24 vertically downwardly, clutch handle 34 is moved to its engaged position, as illustrated in FIG. 3. In this position spring washer 68 normally applies a biasing force which maintains balls 58 in notches 56 in drive clutch member 50. Drive motor 28 rotates gear 76 which in turn drives gear 53 through teeth 54 to rotate connector 52 and drive clutch member 50. As drive clutch member 50 rotates, it in turn rotates clutch plate 60 through the connection between balls 58 and notches 56. This rotates internal clutch shaft 44, which rotates outer shaft 45 and pinion 36 to move rack 38 vertically downwardly.

When clutch handle 34 is in the actuated position illustrated in FIG. 3, spring washer 68 biases balls 58 into notches 56 and drive is transmitted from drive clutch member 50 to clutch plate 60. The biasing force creates a predetermined slip force between balls 58 and notches 56. Should a drive force between balls 58 and notches 56 exceed the predetermined slip force created by spring washer 68, balls 58 move outwardly of notches 56 and rotational drive will no longer be transmitted. Such a situation could occur if there was binding, or if there was some blockage of the movement of annular hole cutter 24. In the disclosed embodiment, once ball 58 has moved outwardly of notch 56 the drive force will no longer be transmitted to balls 58 and spring washer 68 returns them towards notches 56. As long as the obstruction or binding continues, however, balls 58 will again be forced back outwardly of notches 56. In a sense, the clutch plate 60 will be automatically returned towards clutch member 50 by spring washer 68. Thus, in the event of any unduly large force between drive clutch member 50 and clutch plate 60 the two will slip relative to each other.

In order to adjust the slip force from spring washer 68 on plunger 66 one merely removes cover 80, from gear box 30 and rotates adjustment nut 70 on threads 71 to move pins 72 towards or away from spring washer 68. As pins 72 compress or relax spring washer 68 the biasing force from spring washer 68 on plunger 66 and balls 58 is adjusted. In this way, the slip force maintaining balls 58 in notches 56 is adjustable.

The size of notches 56 may increase with wear and it becomes important to have an increasingly large biasing force maintaining balls 58 in notches 56 to achieve a predetermined slip force. Also, for certain cutting situations it may be desirable to have a higher slip force maintaining balls 58 in notches 56. Thus, it may sometimes be desirable to adjust the biasing force from spring washer 68. Further, sensor 40 provides an override to monitor and shut down motors 22 and 28 in the event of any abnormality. In prior art devices which lack some monitoring means it may not be advisable to have an adjustable spring force since the spring force could be adjusted too high and cause damage to the tool, and, or harm the user.

When it is desired to cease vertical movement of annular hole cutter 24, clutch handle 34 is moved to unactuated position 74. Toggle 41 moves internal clutch shaft 44 to the left from the position shown in FIG. 3, to the position shown in FIG. 4. After a short initial movement stepped washer 64 abuts clutch plate 60 and moves it against the spring biasing force to the left to withdraw balls 58 from notches 56. In this position, even if drive motor 28 continues to rotate, drive clutch member 50 does not rotate clutch plate 60 and pinion 36 remains stationary such that annular hole cutter 24 is not moved vertically.

A preferred embodiment of the present invention has been disclosed, however, a worker of ordinary skill in the art would recognize that certain modifications would come within the scope of this invention and thus the following claims should be studied in order to determine the true scope and content of the present invention.

I claim:

1. A rotary driven tool comprising:

a rotary tool for performing work on a workpiece and a first means for rotating said rotary tool about an axis;

a second means for moving said rotary tool axially along said axis towards the workpiece;

a clutch selectively transmitting drive from said second means to said rotary tool to move said rotary tool along said axis, said clutch consisting of at least first and second members that are selectively movable between a disengaged position and an engaged position at which said members transmit drive to move said rotary tool along said axis, a bias force moving said members towards each other when in the engaged position by a predetermined force to limit the drive force between said members, and said first and second members moving away from each other such that said first and second members no longer transmit drive in the event that a drive force between said first and said second members exceed said predetermined force, said bias force automatically returning said first and second members back towards each other after they have initially moved away from each other and a handle is actuated between engaged and disengaged positions to move said first and second members between said engaged and disengaged positions, said handle being locked when in said disengaged position.

2. A rotary tool as recited in claim 1, wherein said first member is selectively movable into engagement with said second member, and is then spring-biased into said second member by said predetermined force.

3. A rotary driven tool comprising:

a rotating tool for performing work on a workpiece and a first means for rotating said rotary tool about an axis;

a second means for moving said rotary tool axially along said axis towards the workpiece;

a clutch selectively transmitting drive from said second means to said rotary tool to move said rotary tool along said axis, said clutch consisting of at least first and second members that are selectively movable between a disengaged position, and an engaged position at which said members transmit drive to move said rotary tool along said axis, a bias force moving said members towards each other when in the engaged position by a predetermined force to limit the drive force between said members, and moving away from each other such that they no longer transmit drive in the event that a drive force between the two exceeds said predetermined force;

said first member being selectively movable into engagement with said second member, and being spring-biased into said second member by said predetermined force; and said first member is a selectively movable clutch plate, said clutch plate carrying a plurality of ball elements and said second member comprising a surface to receive said balls and transmit rotational drive from said second member to said first member, said second means normally rotating said second member such that when said first member is selectively moved into engagement with said second member, such that rotational drive is transmitted to said first member, causing said rotary tool to move along said axis.

4. A rotary tool as recited in claim 3, wherein said clutch plate carries said balls at a radially outer surface.

5. A rotary tool as recited in claim 3, wherein when said members are in said engaged position said second means transmits rotational torque to a linear drive connection which drives said rotary tool along said axis.

6. A rotary tool as recited in claim 5, wherein said rotary tool can also be moved manually along said axis.

7. A rotary tool as recited in claim 3, wherein said spring bias is placed on said first member by at least one spring washer.

8. A rotary tool as recited in claim 7, wherein said predetermined force from said spring bias is adjustable.

9. A rotary tool as recited in claim 8, wherein said spring washer applies a force to a plunger which in turn biases said first member into said second member.

10. A rotary tool as recited in claim 1, wherein said predetermined force is adjustable.

11. A rotary tool as recited in claim 10, wherein adjustment means for adjusting said predetermined force are accessible externally from said clutch.

12. A rotary tool as recited in claim 1, wherein said bias force locks said handle at said disengaged position.

13. A rotary tool as recited in claim 1, wherein said handle actuates a washer to move said members to a disengaged position, and moves a predetermined distance before moving said members to the disengaged position.

14. A rotary tool as recited in claim 13, wherein said predetermined distance is adjustable.

15. A rotary driven tool comprising:

a rotating tool for performing work on a workpiece and a first means for rotating said rotary tool about an axis;

a second means for moving said rotary tool axially along said axis towards the workpiece;

means to monitor the operation of said rotary tool and stop said first rotary means and said second means if said rotary tool is not operating properly; and a clutch selectively transmitting drive from said second means to said rotary tool to move said rotary tool along said axis, said clutch consisting of at least first and second members that are selectively movable between a disengaged position and an engaged position at which said members transmit drive to move said rotary tool along said axis, a bias force moving said first and second members towards each other when in the engaged position by a predetermined force to limit the drive force between said first and second members, and said first and second members moving away from each other, such that said first and second members no longer transmit drive in the event that a force between said first and said second members exceeds said predetermined force, said bias force automatically returning said first and second members back towards each other after they have initially moved away from each other, said predetermined force being adjustable;

said predetermined force is provided by at least one spring washer with said spring washer applying a force to a plunger which in turn biases one of said members into the other, said predetermined force being adjustable by moving an adjustment member which changes the biasing force from said at least one spring washer on said clutch members, said adjustment member is a nut which is turned to compress or relax said spring member.

16. A rotary driven tool comprising:

a rotating tool for performing work on a workpiece and a first means for rotating said rotary tool about an axis;

a second means for moving said rotary tool axially along said axis towards the workpiece;

a clutch transmitting drive from said second means to said rotary tool to move said rotary tool along said axis, said clutch consisting of at least two members biased into engagement by a predetermined force and moving away from each other, such that they no longer transmit drive in the event that a force between the two exceeds said predetermined force, said predetermined force being adjustable; and said clutch includes a clutch plate carrying a plurality of ball elements, and a second member having a surface to receive said balls and transmit rotational drive to said clutch plate, said second means normally rotating said second member such that when said balls are received in said second member, rotational drive is transmitted to said clutch plate, causing said rotary tool to move along said axis.

17. A rotary tool as recited in claim 16, wherein said clutch plate carries said ball elements at a radially outer surface.

18. A rotary tool as recited in claim 16, wherein said predetermined force is applied to a plunger which biases said clutch plate into said second member.

19. A rotary tool as recited in claim 1, wherein said bias force is provided by a spring which directly contacts and biases one of said first and second members towards the other.

20. A rotary driven tool as recited in claim 15, wherein said bias force is provided by a spring which directly contacts and biases one of said first and second members towards the other.

* * * * *